United States Patent
Tan et al.

(10) Patent No.: US 9,857,474 B2
(45) Date of Patent: Jan. 2, 2018

(54) USING SATELLITE VISIBILITY DATA FOR IMPROVED LOCATION ACCURACY

(71) Applicant: Microsoft Corporation, Redmond, WA (US)

(72) Inventors: Zhiyong Tan, Houston, TX (US); David C. Chu, Kirkland, WA (US); Lin Zhong, Houston, TX (US); Paramvir Bahl, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 857 days.

(21) Appl. No.: 13/831,418

(22) Filed: Mar. 14, 2013

(65) Prior Publication Data

US 2014/0266876 A1    Sep. 18, 2014

(51) Int. Cl.
   *G01S 19/05*   (2010.01)
   *G01S 19/22*   (2010.01)
   *G01S 19/25*   (2010.01)
   *G01S 19/42*   (2010.01)

(52) U.S. Cl.
   CPC .............. *G01S 19/05* (2013.01); *G01S 19/22* (2013.01); *G01S 19/258* (2013.01); *G01S 19/42* (2013.01)

(58) Field of Classification Search
   CPC ........ G01S 19/05; G01S 19/22; G01S 19/258; G01S 19/42
   USPC .................................................... 342/357.42
   See application file for complete search history.

(56) References Cited

U.S. PATENT DOCUMENTS

| | | | | |
|---|---|---|---|---|
| 7,085,309 | B2* | 8/2006 | Oesch | G01S 19/22 342/357.61 |
| 2007/0008217 | A1* | 1/2007 | Yang | G01S 19/24 342/357.68 |
| 2011/0093159 | A1* | 4/2011 | Boling | G06Q 10/06 701/29.6 |
| 2012/0146850 | A1* | 6/2012 | Liu | G01S 19/34 342/357.42 |
| 2013/0150088 | A1* | 6/2013 | Nasir | H04W 4/001 455/456.3 |

FOREIGN PATENT DOCUMENTS

| | | | |
|---|---|---|---|
| CN | 101772710 | A | 7/2010 |
| CN | 102271158 | * | 12/2011 |
| EP | 2458406 | A1 | 5/2012 |
| GB | 2476718 | A | 7/2011 |

(Continued)

OTHER PUBLICATIONS

"International Preliminary Report on Patentability Received for PCT Application No. PCT/US2014/022868", dated Jun. 19, 2015, 12 Pages.

(Continued)

*Primary Examiner* — Frank J McGue

(57) ABSTRACT

Described is a technology by which GPS-capable devices work with a cloud service to receive satellite visibility-related data. The satellite visibility-related data may be used to determine a location, and/or to abort a search for satellites. The cloud service may use crowd data from other GPS-capable devices. In one aspect, line-of-sight satellites are differentiated from other satellites, and used to determine which satellite signals are more trustworthy. Reflected signals also may be determined.

20 Claims, 7 Drawing Sheets

(56) References Cited

FOREIGN PATENT DOCUMENTS

| WO | 03089954 A1 | 10/2003 |
|---|---|---|
| WO | 2009016242 A1 | 2/2009 |
| WO | 2012082996 A1 | 6/2012 |
| WO | 2012085876 A2 | 6/2012 |

OTHER PUBLICATIONS

"International Search Report & Written Opinion Received for PCT Application No. PCT/US2014/022868", dated Oct. 21, 2014, 18 Pages.
"First Office Action and Search Report Issued in Chinese Patent Application No. 201480014874.0", dated Oct. 17, 2016, 15 Pages.
"Office Action Issued in Chinese Patent Application No. 201480014874.0" dated Jun. 9, 2017, 10 Pages.

* cited by examiner

USING SATELLITE VISIBILITY DATA FOR IMPROVED LOCATION ACCURACY

BACKGROUND

GPS (global positioning system) signals are not particularly good at penetrating dense materials such as walls and windows. This is primarily because GPS signals, at 1575.42 MHz and 1227.60 MHz, have low skin depth when hitting building surfaces. As a result, signals from a GPS satellite can be completely blocked by buildings on the ground.

Because in general a GPS receiver needs signals from at least four satellites to determine its location accurately, when ground buildings block signals from too many GPS satellites, the receiver may suffer significantly in its location accuracy. Further, buildings may reflect GPS signals, so that even if signals of four or more GPS satellites are received, the location accuracy can be reduced.

Still further, even when line-of-sight with four satellites is available, in certain scenarios such as when the GPS receiver is between tall buildings, the satellites having line-of-sight with the receiver may be on closely-parallel paths (e.g., the geometry is such that the angles are all close to straight down), causing what is known as a high dilution-of-precision (DOP). This also reduces accuracy.

Such circumstances are common in downtown areas where streets are surrounded by high rises. This is sometimes referred to as the "GPS urban canyons" problem. Tall trees sometimes can cause similar effects.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a GPS-capable device receives satellite visibility-related data communicated from a cloud service. The satellite visibility-related data is used to determine a location, and/or to abort a search for satellites.

In one aspect, a cloud service is configured for communication with GPS-capable devices via a wireless connection. The cloud service includes a crowd data processing program configured to process data from at least one other GPS-capable device into location-related data provided to a GPS-capable device.

In one aspect, a second set of satellites is obtained that corresponds to which satellites are predicted to have GPS signals line-of-sight visible to a device in the presence of obstructions. The second set is based upon a first set of satellites corresponding to which satellites are predicted to have GPS signals detected by the device in the absence of obstructions. The second set is used to determine which satellite signals are more trustworthy.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using satellite visibility information to improve location estimate accuracy and/or save energy. One aspect is directed towards determining satellite visibility based upon reflected GPS signals. Another aspect is directed towards using crowd data corresponding to sky view matching to determine a sky map.

It should be understood that any of the examples herein are non-limiting. For one, while a mobile device is used as an example of a suitable device for implementing the technology described herein, a more stationary (e.g., built-in or partially built-in) automotive device may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer-related driving experiences including assistance, alerts and notifications in general.

Figure 1:
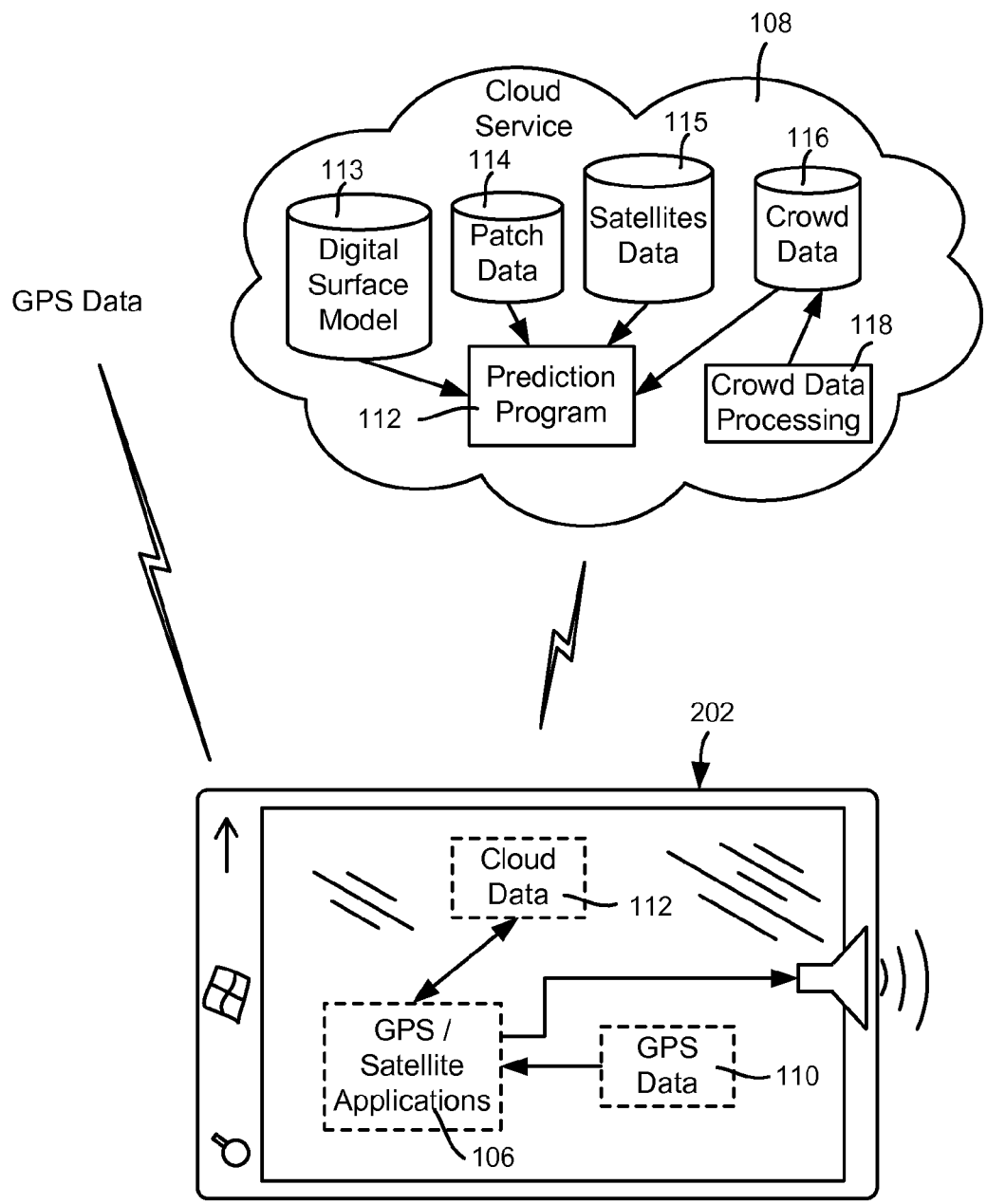
FIG. 1 is a representation of an architecture comprising a cloud service and a GPS-capable device, in which the cloud service is configured to provide satellite-related visibility data to the device, according to one example embodiment

FIG. 1 is an example block diagram showing components of one example architecture comprising a mobile device 102 (e.g., in a moving vehicle) running various GPS-related applications 106, including for example conventional mapping/navigation applications, as well as one or more satellite-visibility applications as described herein. The mobile device 102 is coupled to a cloud service 108, e.g., that works with at least one of the applications 106 to provide improved location information when possible.

The mobile device 102 may be implemented in a smartphone, as generally represented in FIG. 1. Instead of a smartphone, it is understood that another device may be used. For example the application or similar logic/code may run on a dedicated GPS device coupled to or having internet connectivity, or on a device built into a vehicle; (e.g., as part of a typical built-in vehicle navigation or entertainment system), and so forth.

As described herein, one or more of the GPS/satellite applications 106 receive GPS data 110 from visible (line-of-sight) GPS satellites via a GPS device including an antenna, and receives and sends cloud data 112 from and to the service 108. Reflected satellite information also may be received in the GPS data 110. By using various data as described herein, the service 108 is able to work with the applications 106 to often provide improved location accuracy, including in urban canyon scenarios, as well as save energy in certain scenarios.

Note that the mobile device 102 may use any input and output mechanisms to exchange information with a user. A display may output visible information and if touch-sensitive also may receive touch input from a user. A speaker may output audio data, such as spoken navigation directions, and the like. As can be appreciated other input and output mechanisms may be used. For example, user input may comprise any input data received, including via a Natural User Interface (NUI), where NUI generally refers to any interface technology that enables a user to interact with a device in a "natural" manner, such as free from artificial constraints imposed by input devices such as mice, keyboards, remote controls, and the like. Examples of NUI include those based upon speech recognition, touch and stylus recognition, gesture recognition both on screen and adjacent to the screen, air gestures, head and eye tracking, voice and speech, vision, touch, gestures including motion gestures, and machine intelligence. Motion gesture detection may use accelerometers/gyroscopes, facial recognition, 3D displays, head, eye, and gaze tracking, immersive augmented reality and virtual reality systems, which provide a more natural interface, as well as technologies for sensing brain activity using electric field sensing electrodes (EEG and related methods).

In one implementation of the cloud service 108, as shown in FIG. 1, a prediction program 112 is able to use various data 113-116 (and possibly other data) to improve the location accuracy of the mobile device 102 in many instances. For example, the availability of a GPS satellite can be obtained via offline simulation in the cloud 108. The program (or a separate program) also may often save device energy, as described below. Also shown in FIG. 1 is crowd data processing 118, which operates on data received from users, as also described below. Note that at least some of the processing described herein may be performed by the mobile device 102.

As used hereinafter, the set of satellites whose signals are observed by a GPS receiver at a given time and location, that is, the device's captured set, is denoted as M.

Consider line-of-sight satellites without terrain data (e.g., at least one digital surface model (DSM)), in which the set of such satellites is referred to as S1. In other words, S1 contains the satellites at a given location and time assuming there are no obstructions (regardless if there actually are). With satellite ephemeris information, shown in FIG. 1 as part of the satellites data 115, the set of satellites S1, whose signals are available at a given time at any location may be obtained, without considering terrestrial structures. Note that as the inaccuracy ephemeris of a GPS satellite increases with time, and the ephemeris message needs at least thirty seconds to transmit, the time-to-first-fix (TTFF) of a receiver is shorter if the receiver had been recently used.

In one implementation, the set S1 contains the set of satellites with a minimum of ten degrees elevation above the horizon, which is consistent with an elevation mask of ten degrees set in most GPS receivers. S1 may be obtained by using line of sight ray tracing, comparing the position of each satellite relative to the map center. Exact receiver location is not required. Thus, the captured set M is a subset (or equal to the full set) of S1, i.e., $M \subseteq S1$. Note that S1 can also be derived from the almanac component of the GPS message. However, transmission of the almanac takes over twelve minutes and is thus relevant only for very old receivers with slow GPS signal acquisition. Modern receivers, with faster acquisition times, usually search for all GPS satellites.

If terrestrial structure information (e.g., DSM, shown in FIG. 1 as a digital surface model 113) is also known, the service 108 (or receiving device) can compute a set of satellites, S2, whose signals are available via line of sight at a given time at any location. S2 is obtained using a similar method as that to produce S1, and as is understood, $S2 \subseteq M \subseteq S1$. To this end, given a receiver position and S1 positions, a straight line is "drawn" between the receiver and each satellite. If the line does not intersect any buildings in the digital surface mod, there is line-of-sight between the receiver and satellite. Thus, the set S2 contains the satellites that have line-of-sight to the receiver. As can be readily appreciated, additional terrain information, such as material composition of buildings, may further provide useful information, as these factors can be considered with respect to line-of-sight and reflection.

Note that the long distance from a satellite to a receiver (20,200 km at zenith) makes errors in satellite elevation angle from broadcast ephemeris inaccuracy (approximately one meter) trivial. However, the accuracy of determining S2 is dependent at least in part on the DSM accuracy.

Turning to another aspect, namely reflection of GPS signals by terrestrial structures, additional useful information is obtained by the service 108. More particularly, if reflection is considered, a set of satellites S3 may be obtained from GPS receivers; the set contains satellites whose signals are available, yet based upon line of sight at a given time at any location should not be available, hence are reflected. Thus, this may be expressed as $S3 \subseteq S1$ as well as $(S2 \cup S3) \subseteq S1$.

Note however that S2 tends to present fewer satellites than what are actually detectable at ground truth. In the computations, a single parameter θ may be used to denote how aggressively a detected satellite is considered to be a reflection or not based upon the angle to the receiver. This is basically a tradeoff between more coverage versus more false positives. A larger θ indicates more reflective paths, reflective paths of more reflection, and more diffusive reflection. This gives $S3(\theta_1) \subseteq S3(\theta_2)$ if $\theta_1 \leq \theta_2$. Ideally, $S2 \cup S3 = M$, however in practice, a value for $\theta_0$ needs to be found such that $S2 \cup S3(\theta_0) \approx M$. Note that $\theta_0$ is determined not only by the simulation details but also by the sensitivity and computational power of the GPS receiver.

Thus, described herein is a combination of ray-tracing and heuristics, where ray tracing is a first step in statistical analysis. More particularly, detection probability of satellites without line-of-sight is proportional to the total area of possible reflection surfaces or to the signal reflection angle. The area of possible reflection surfaces may be calculated by using ray tracing techniques on the DSM points with line-of-sight to both the satellite and the receiver. The reflection angle may be determined using ray tracing techniques.

While it can be difficult to derive $S3(\theta)$, $S3(\infty)$ (i.e., with an infinite angle) can be derived much more readily. With the terrestrial structure information and satellite ephemeris information, another set, S4 may be derived as the subset of S1 whose signals will be definitely blocked by the terrestrial structures. This means that of the set S1, the set $S3(\infty)$ is the remaining set of satellites after removing the line-of-site satellites in S2 and those definitely blocked in S4, that is, $S3(\infty) = S1/(S2 \cup S4)$; $S2 \subseteq M \subseteq S1/S4 \subseteq S1$.

Described herein is using such GPS satellite information for various purposes when satellite signal prediction is available at various levels. For example, if S1 is available, this information may be used to improve the energy efficiency of a GPS receiver by reducing the search time for satellite signals (e.g., abort the search when M=S1). Note that current GPS receivers attempt to acquire all satellites, generating pseudorandom number (PRN) codes for all satellites.

Figure 2A:
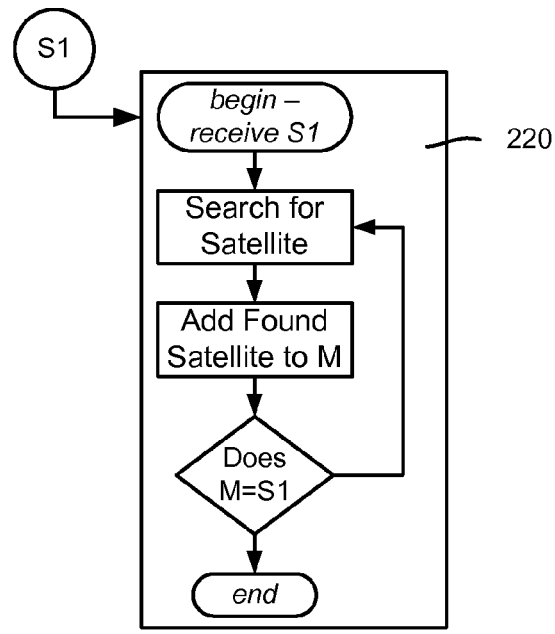
FIGS. 2A and 2B are diagrams representing how satellite-related visibility data may be used to abort a search for satellites, according to one example embodiment.

Instead, the service 108 may communicate the set S1 to the receiver, or the receiver may already have the S1 data (or data from which S1 may be derived). For example, a smartphone can download the almanac from the service 108 or another source, e.g., reducing the number of satellites from which signals can be acquired from thirty-one to eight to twelve in number. In any event, instead of searching for more satellites than can possibly be found, the GPS receiver knows that it has captured the full set M because M equals the full set S1 possibly available. Such logic is shown in the application flow diagram 220 of FIG. 2A. Searching for satellites consumes a relatively significant amount of power on a device with GPS receiver, whereby searching for fewer satellites improve energy efficiency.

Further, when the set S2 is available, this set may be used to improve the location accuracy, in general by telling GPS receiver devices which satellite signals to trust as line of sight signals. As described above, S2 may be determined from S1 and DSM data 113.

Figure 2B:
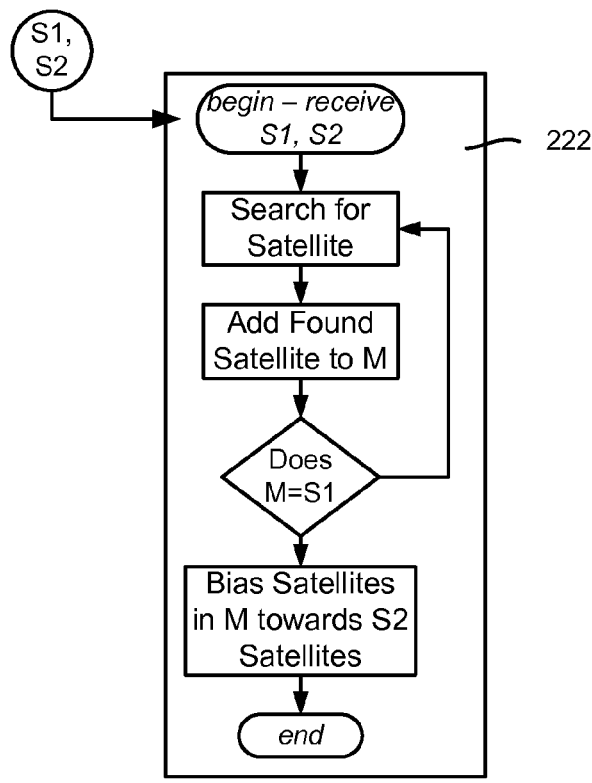

However, it is feasible that a GPS device may detect signals from satellites that are not just line-of-sight satellites (such as because of reflection, or because the DSM has inaccuracies). Thus, one usage/application of determining S2, shown as the logic/flow 222 of FIG. 2B, is to inform GPS receivers which satellite signals can be trusted more than others. For example, if the receiver's precise location is known before entering an urban canyon, determination of receiver location within the urban canyon may be improved by the use of a weighting function with weights biased toward satellites in the set S2. The user's path may be predicted, to an extent, for future modifications to S2, for example. As can be readily appreciated, satellite visibility is dependent on the extent of deviation of line-of-sight from the satellite.

Figure 3:
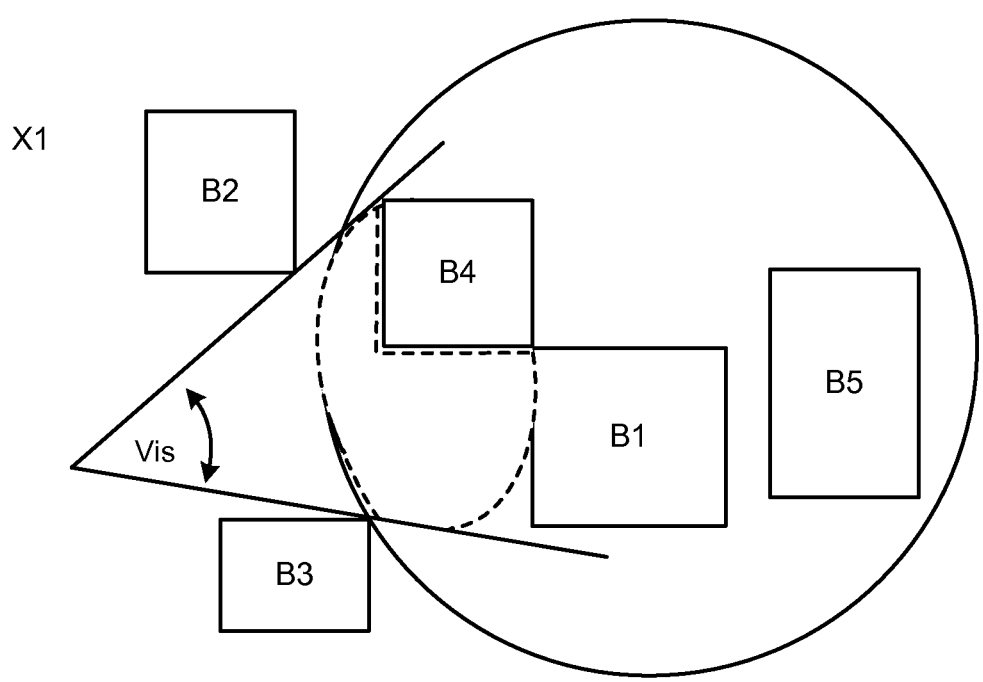
FIG. 3 is a representation of satellite-related visibility data may be used to narrow a location, according to one example embodiment.

When the set of S4 is available, this set may be used to further improve the energy efficiency of GPS (e.g., by aborting the search when M=S1/S4, that is, reduce the set S1 by those in S4). For purposes of brevity this logic is not shown, as it is similar to that in FIG. 2B only varied by the computation performed in the decision step. Further, S4 may be used to improve the accuracy of location by comparing M against S1/S4 for various locations, ruling out locations where M⊆S1/S4 does not hold Moreover, S4 can be used to reduce the number of dead zones in which a receiver is located. If a receiver acquires any satellite in S4, this indicates that it is not in such a region. This is represented in FIG. 3, where the circle represents a dead zone because of buildings B1-B5; if however satellite X1 is visible to a receiver, the receiver has to be within the area approximately represented by the dashed lines. If satellite X1 is not visible to a receiver, the receiver is at another location in the circle; it is the absence rather than the presence of a satellite that provides location information.

Identifying worst urban canyons where |S1/S4|<4 provides information that can be used to improve navigation (e.g., by routing a car around the canyons). For example, in a scenario where the user does not need to enter a dead zone, but is simply driving through en route to a destination, the receiver may direct the user to avoid the regions of urban canyon where S2<4, preventing the user from losing his or her way. Note that this is based upon extrapolation of satellite position forward in time because the driver is not currently in the presumed dead zone.

As described herein, considering reflection leads to an approximate determination of S3. The determination of S3 may be done in a cloud service, (e.g., not in the receivers), and then broadcast to receivers. Further refinement of S3 can be made by matching prediction to reality. For example, if a receiver can receive greater than or equal to four satellites in a spot within S3, the cloud can update and rebroadcast this information appropriately.

In current smartphone GPS applications, when the number of acquired satellites is less than four, the user is presented with a 1 Km accuracy radius centered on the last known location. Knowledge of which regions have S3 with less than four satellites can reduce the accuracy radius, to only the extent of the urban canyon in which S3 is less than four, aiding the user by narrowing the range of possible locations the user is in. When $S3(\theta_0)$ is available, that is, $S2 \cup S3(\theta_0) \approx M$, further improvement of the energy efficiency and location accuracy of the GPS is possible, and more urban canyons may be identified.

Contemporary GPS receivers work in isolation in determining location, by accessing a server for Geographic Information System (GIS) applications, typically to obtain a relevant map that so the receiver screen can display its location on a map for the user. Although the receiver can download satellite ephemeris online, decreasing time-to-first-fix (TTFF), location determination is not externally-aided. As described herein, crowd approaches that use external aids, such as other GPS receivers or even the user, can assist in determining receiver location.

Turning to another aspect, a "user in the loop" is one proposed approach to navigation, in which the user interacts with the device beyond requesting his location or directions to a destination. More particularly, the user may act as a "sensor" in a two-way approach, (in contrast to current approaches to navigation devices which are based upon a one way interaction in which the user simply requests his location from the receiver). The two-way approach is based upon having devices request information from users to improve location estimation, which can lead to fewer errors. As can be readily appreciated, the user in the loop can be seen as a solution until technologies which do not require user participation are developed.

Currently, the sources of information to the receiver are the sensors in the receiver. Described herein is extending this to the cloud, including the further extension is which the user acts as a sensor. The receiver can issue queries for information to the user, with the user responses are used to improve location estimation.

For example, consider an application that pinpoints an arbitrary number (set by the user) of locations closest to the location estimate. Such locations can include any kind of landmark, such as a shop. The user can be periodically informed of prominent landmarks in his or her immediate vicinity, which will allow the user to visually check if the receiver is providing correct directions. The user can look around to spot the locations that match those identified by the application, and interact to provide such information to the cloud service. Machine-learning and other processing techniques related to crowd sourcing/data mining may be used to gradually improve location estimates, using accumulated data from many sources.

In one aspect, human-in-the-loop data may be used for crowd sourcing via a concept described herein referred to as sky view matching. A general premise of sky view matching is that a user $u_1$ who observes satellites $\vec{s}_1$ can refine his or her position based on satellite observations $\vec{s}_2$ from user $u_2$. One example case is when users $u_1$ and $u_2$ submit GPS queries at the nearly the same time. Assuming that coarse-grained localization (e.g., kilometer resolution) is available (e.g. from cell base station IDs), then if $\vec{s}_1 = \vec{s}_2$, $u_1$ can utilize the position correction submitted by $u_2$.

Figure 4:
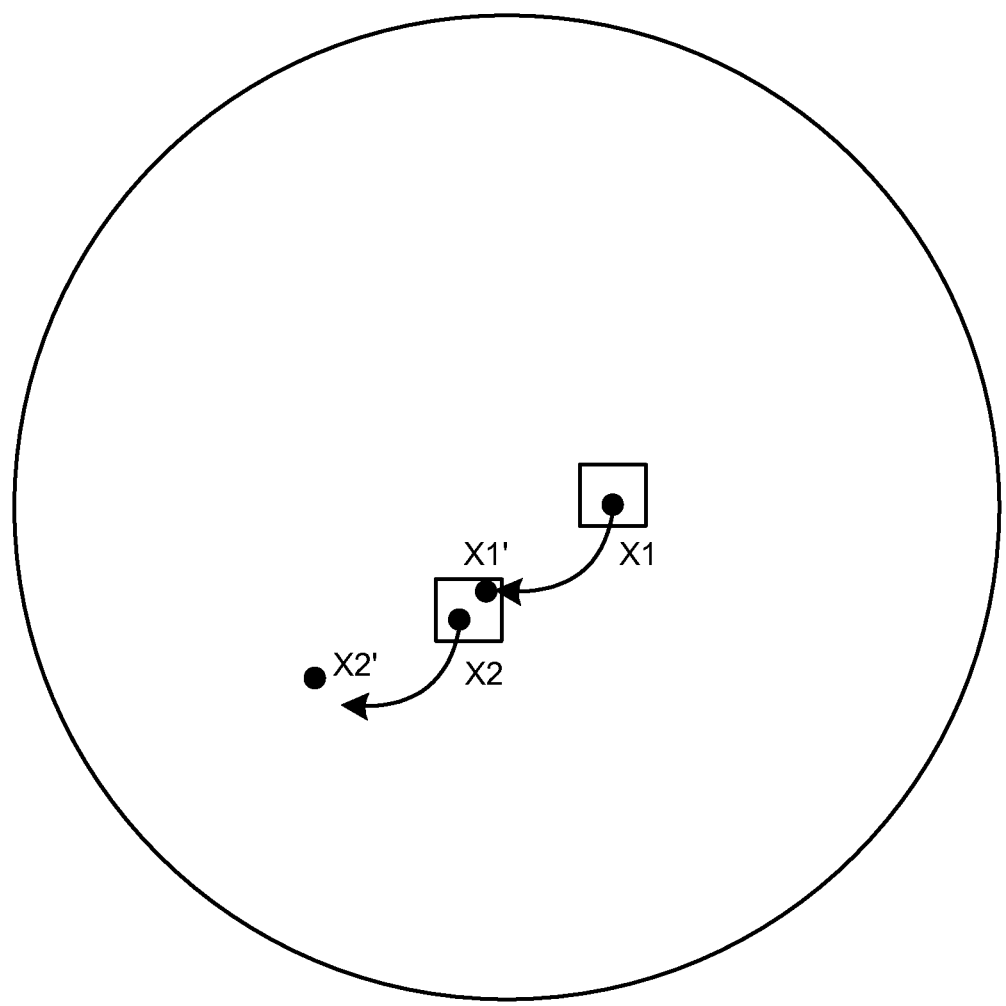
FIG. 4 is a representation of how sky patches corresponding to satellite-related visibility data may be used to provide location data, according to one example embodiment.

In a more complex example, when $u_1$ and $u_2$ submit GPS queries that are not at the same time, the change in satellite position needs to be reconciled. To this end, a function patch $t(s) \rightarrow p$ converts a set of satellite s at time t to a (set of) sky patch p. A sky patch represents a small area of visible sky, as generally represented by the boxes in FIG. 4. As represented in FIG. 4, over time a satellite X1 moves to a new position, shown as X1', and similarly, a satellite X2 moves to a new position, shown as X2'.

More formally, when applied to a satellite $\vec{s}_2$ at time $t_2$, the resulting patch $\vec{p}_2$ then identifies a time-independent set of sky patches visible to a $u_2$ at their correct position L. Subsequently, when a future user $u_1$ applies the patch function at time $t_1$, the match of two user's sky patches allows $u_1$ to use the corrected position supplied by $u_2$.

A patch_t( ) function can convert a satellite to a sky patch by reporting patches as <elevation, azimuth, tolerance> tuples. Elevation and azimuth are standard satellite position coordinates reported by GPS satellites. The match function used is match_$\tau(\vec{p}_1, \vec{p}_2)$ and includes a tolerance degree $\tau$. Two satellites whose elevations (and azimuths) are within $\tau$ degrees are considered a match. A smaller $\tau$ places a tighter bound on satellite positioning similarity while bigger $\tau$ allows greater usage of crowd-sourced data at the expense of noisier matches.

In another aspect, it is feasible to further refine location by identifying similarities between the error data collected by $u_1$ and $u_2$. More particularly, in a typical GPS receiver such as those found on smartphones, error data comprises per-satellite SNR, and aggregate Dilution of Precision (DoP) data. As described above, DoP is a measure of how well-separated satellites are, and hence how sensitive to measurement error is the location estimation. This error data is often discarded by the time it reaches the application layer. Instead of discarding, this error data in conjunction with the sky patches may be used to compute whether two users whose error data is similar (e.g. SNR values match) correctly determined whether two users are in a similar location.

When a user exploits the user-in-the loop technique described above, his or her measurement of GPS satellite signals can be collected by the cloud service 108 along with the final, accurate location. The measurement of GPS satellite signals can help build the user's "view" of the sky at that location with each satellite serving as a sample point in the sky, because the satellite locations in the sky are known, given the time. From the set of satellites S2 the line-of-sight sky view for each location is known. The actual measurements from end users allow expanding the sky view beyond line-of-sight to include part of the sky that is supposedly blocked by buildings. When a satellite is in this part of the sky, its signal will be received at the ground location.

A sky view can be represented by a collection of locations in the sky for visible satellites at the ground location. The sky view can be aggregated from many sky views from different times at the same location. Moreover, the sky view can be processed with heuristics to be a continuous region of the sky, instead of a collection of points in the sky.

In a representation of the data, the sky view can be black-white, with black being satellite locations whose signals will be received at the ground location, and white being those whose will not. The sky view can be represented in grayscale such that each location in the sky is associated with a probability from where a satellite signal will be received at the ground location.

With a large number of sky views collected from mobile devices, along with the corresponding ground locations, a system may figure out the ground location of a user given their sky view by matching a new sky view with the ones having known ground locations.

If a receiver can acquire an accurate location, then it is known with certainty that this receiver is not in a GPS dead spot. This receiver can insert its location into the cloud. Receivers in dead spots in the surrounding area can use this information to exclude this location from the list of possible dead zones they are in.

Example Mobile Device

Figure 5:
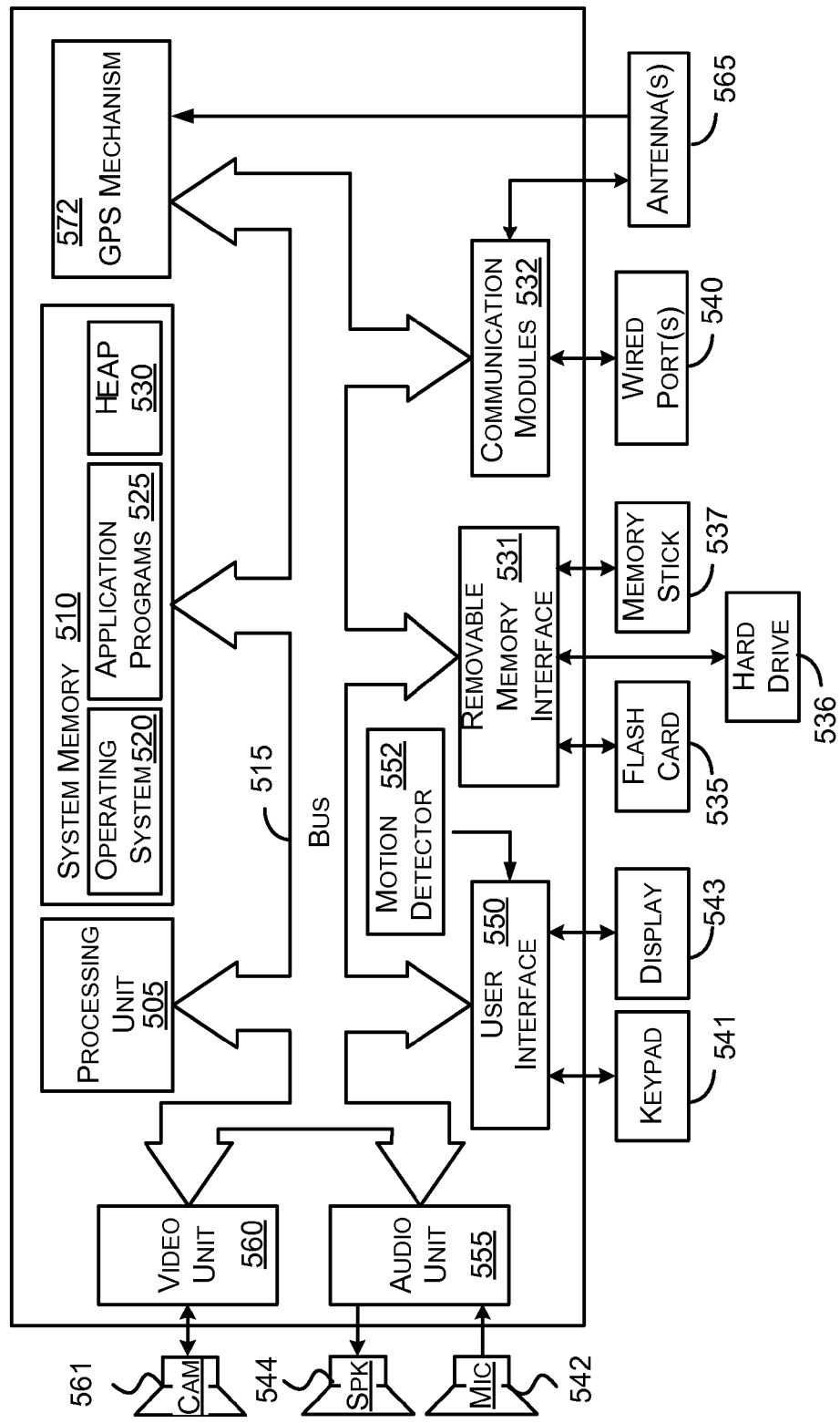
FIG. 5 is a block diagram representing an example computing environment, in the form of a mobile device, into which aspects of the subject matter described herein may be incorporated.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE 5394, one or more of the wired port(s) 540, or antenna(s) 565. In these embodiments, the removable memory devices 535-437 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-437 and their associated computer storage media, discussed above and illustrated in FIG. 5, provide storage of computer-readable instructions, program modules, data structures, and other data for the mobile device 500. For example, the removable memory device or devices 535-437 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

Example Networked and Distributed Environments

One of ordinary skill in the art can appreciate that the various embodiments and methods described herein can be implemented in connection with any computer or other client or server device, (e.g., in a cloud service), which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
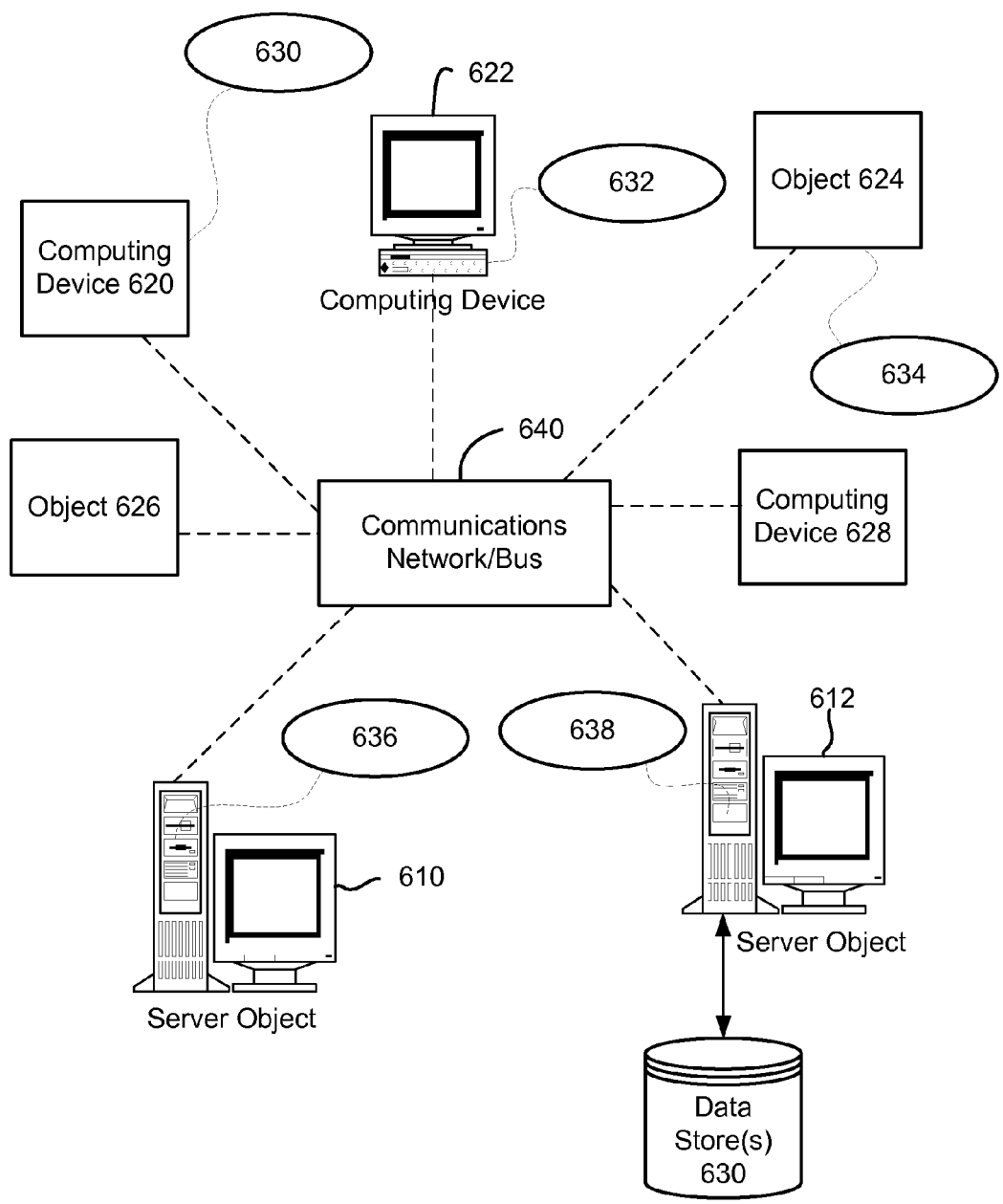
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device, such as one of possibly many used in a cloud service.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
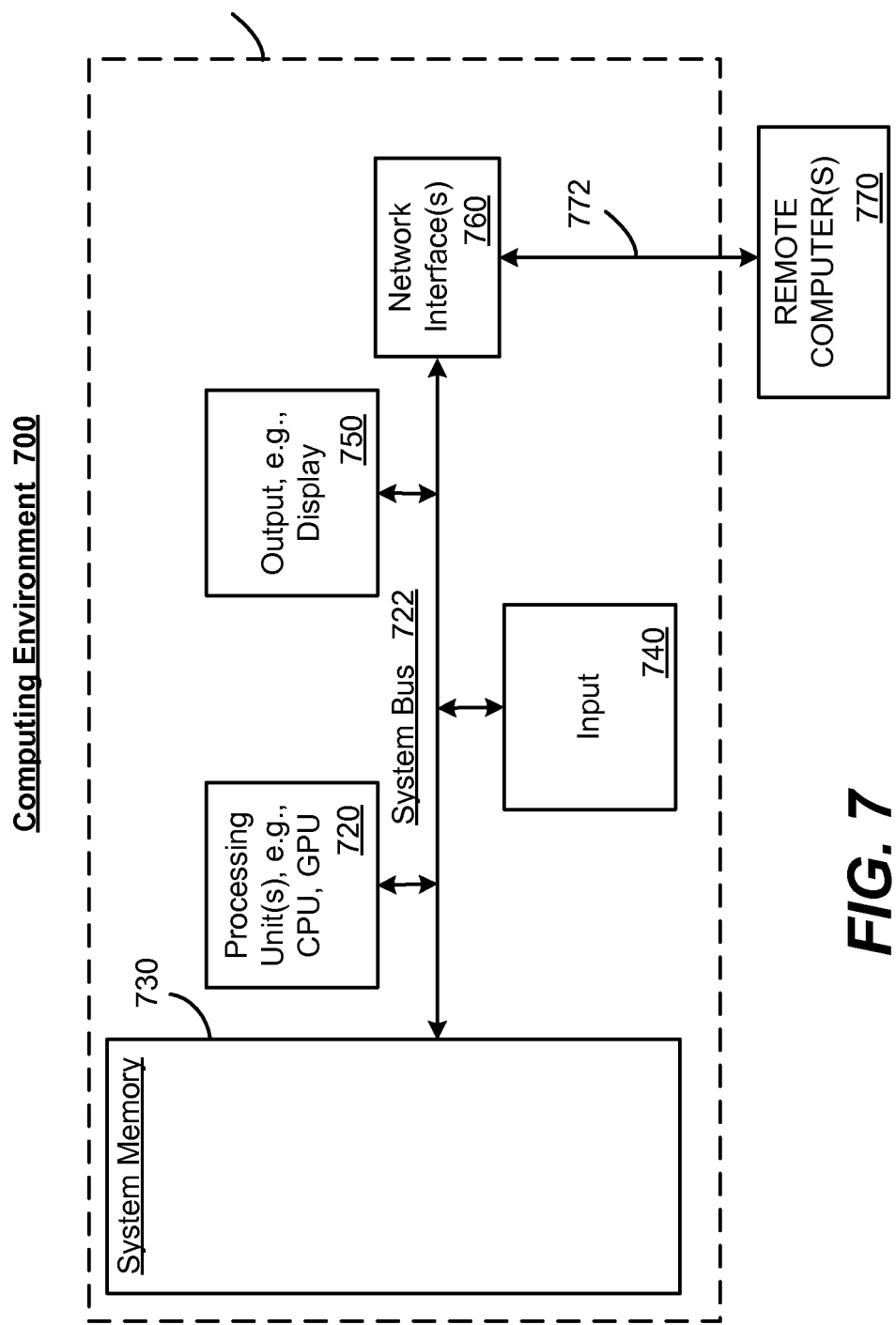
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method performed at least in part on at least one processor executing on a global positioning system (GPS)-capable device, the method comprising:
    receiving, from a cloud service, satellite visibility-related data related to a predicted visibility between a plurality of satellites and the GPS-capable device;
    computing a first sub-set of satellites from the plurality of satellites, the first sub-set of satellites comprising one or more satellites whose signals should be available at a given time and a given location in the absence of terrestrial structures;
    computing a second sub-set of satellites from the plurality of satellites, the second sub-set of satellites comprising one or more satellites whose signals are available via line of sight at the given time and the given location;
    computing a third sub-set of satellites from the plurality of satellites, the third sub-set of satellites comprising one or more satellites whose signals are available and determined to be reflected based upon line of sight at the given time and the given location;
    calculating reflection angles of the signals from the third sub-set of satellites;
    predicting a path of a user associated with the GPS-capable device;
    applying a weighting function to the plurality of satellites, the weighting function first biasing weights ascribed to the signals received from the one or more satellites of the second sub-set of satellites and second biasing weights ascribed to the signals received from the one or more satellites of the third sub-set of satellites based on individual values of the calculated reflection angles and the predicted path;
    using the biased weights and the satellite visibility-related data to determine a location of the GPS-capable device;
    computing a fourth sub-set of satellites from the plurality of satellites, based upon terrestrial data and satellites that are predicted to have GPS signals detected by the GPS-capable device in the absence of obstructions, in which the fourth sub-set corresponds to one or more satellites that do not have line of sight visibility or reflected visibility to the GPS-capable device; and
    aborting a search to obtain signals from a captured set of satellites responsive to the captured set of satellites matching the first sub-set of satellites with the fourth sub-set of satellites removed therefrom.

2. The method of claim 1 further comprising using the biased weight to abort a search for at least one of the plurality of satellites.

3. The method of claim 1 wherein the first sub-set of satellites is a sub-set of or equal to a full set of the plurality of satellites, and wherein the second sub-set of satellites is a sub-set of the first sub-set of satellites.

4. The method of claim 1 wherein computing the third sub-set of satellites further comprises:
    using ray tracing and heuristics to determine which of the one or more satellites that are detected but are not predicted to have line-of-sight visibility are probabilistically detected to be from reflection, based upon the ray tracing and heuristics.

5. The method of claim 1 further comprising:
    aborting a search to obtain signals from a captured set of satellites responsive to the captured set of satellites matching the first sub-set of satellites with the fourth sub-set of satellites removed therefrom.

6. The method of claim 1 further comprising:
    determining an approximate location of the GPS-capable device in a dead zone based upon a failure by the GPS-capable device to detect a satellite signal from any satellite in the fourth sub-set.

7. The method of claim 1 further comprising:
    routing a vehicle associated with the GPS-capable device around an area based upon the satellite visibility-related data.

8. The method of claim 1, wherein the predicted visibility is based in part on one or more of the following: terrain information, ray tracing, heuristics, or signal reflection.

9. The method of claim 8, wherein the terrain information further includes material composition of buildings.

10. The method of claim 1, further comprising:
    requesting user input corresponding to the determined location of the GPS-capable device; and
    updating the determined location to improve a location estimate based at least in part on the user input received.

11. The method of claim 1, further comprising:
    determining an actual visibility between the GPS-capable device and one or more satellites of the plurality of satellites; and
    updating the cloud service with other satellite visibility-related data based upon the determined actual visibility of the one or more satellites and the determined location of the GPS-capable device.

12. A global positioning system (GPS)-capable device comprising:
- a memory;
- at least one processor, communicatively coupled to the memory, that:
  - receives satellite visibility-related data related to a predicted visibility between a plurality of satellites and the GPS-capable device;
  - computes a first sub-set of satellites from the plurality of satellites, the first sub-set of satellites comprising one or more satellites whose signals should be available at a given time and a given location in the absence of terrestrial structures;
  - computes a second sub-set of satellites from the plurality of satellites, the second sub-set of satellites comprising one or more satellites whose signals are available via line of sight at the given time and the given location;
  - computes a third sub-set of satellites from the plurality of satellites the third sub-set of satellites comprising one or more satellites whose signals are available and determined to be reflected based upon line of sight at the given time and the given location;
  - calculates reflection angles of signals from the third sub-set of satellites;
  - predicts a path of a user associated with the GPS-capable device;
  - applies a weighting function to the plurality of satellites to bias weights ascribed to signals received from the second sub-set of satellites and the third sub-set of satellites, the bias towards the third sub-set of satellites based on individual values of the calculated reflection angles and the predicted path;
  - uses the biased weights and the received satellite visibility-related data to determine a location of the GPS-capable device;
  - computes a fourth sub-set of satellites from the plurality of satellites, based upon terrestrial data and satellites that are predicted to have GPS signals detected by the GPS-capable device in the absence of obstructions, in which the fourth sub-set corresponds to one or more satellites that do not have line of sight visibility or reflected visibility to the GPS-capable device; and
  - aborts a search to obtain signals from a captured set of satellites responsive to the captured set of satellites matching the first sub-set of satellites with the fourth sub-set of satellites removed therefrom.

13. The global positioning system (GPS)-capable device of claim 12 wherein the first sub-set of satellites is a sub-set of or equal to a full set of the plurality of satellites, and wherein the second sub-set of satellites is a sub-set of the first sub-set of satellites.

14. The global positioning system (GPS)-capable device of claim 12 wherein the processor is further configured to:
  - determine an approximate location of the GPS-capable device in a dead zone based upon a failure by the GPS-capable device to detect a satellite signal from any satellite in the fourth sub-set.

15. The global positioning system (GPS)-capable device of claim 12 wherein the processor is further configured to:
  - route a vehicle associated with the GPS-capable device around an area based upon the satellite visibility-related data.

16. The global positioning system (GPS)-capable device of claim 12 wherein the predicted visibility is based in part on one or more of the following: terrain information, ray tracing, heuristics, or signal reflection.

17. One or more computer storage devices having computer-executable instructions stored thereon, which upon execution by a computer cause the computer to perform operations comprising:
  - receiving, from a cloud service, satellite visibility-related data related to a predicted visibility between a plurality of satellites and the GPS-capable device;
  - computing a first sub-set of satellites from the plurality of satellites, the first sub-set of satellites comprising one or more satellites whose signals should be available at a given time and a given location in the absence of terrestrial structures;
  - computing a second sub-set of satellites from the plurality of satellites, the second sub-set of satellites comprising one or more satellites whose signals are available via line of sight at the given time and the given location;
  - computing a third sub-set of satellites from the plurality of satellites, the third sub-set of satellites comprising one or more satellites whose signals are available and determined to be reflected based upon line of sight at the given time and the given location;
  - calculating reflection angles of signals from the third sub-set of satellites;
  - predicting a path of a user associated with the GPS-capable device;
  - applying a weighting function to the plurality of satellites, the weighting function first biasing weights ascribed to signals received from the one or more satellites of the second sub-set of satellites and second biasing weights ascribed to signals received from the one or more satellites of the third sub-set of satellites based on individual values of the calculated reflection angles and the predicted path;
  - using the biased weights and the satellite visibility-related data to determine a location of the GPS-capable device;
  - computing a fourth sub-set of satellites from the plurality of satellites, based upon terrestrial data and satellites that are predicted to have GPS signals detected by the GPS-capable device in the absence of obstructions, in which the fourth sub-set corresponds to one or more satellites that do not have line of sight visibility or reflected visibility to the GPS-capable device; and
  - aborting a search to obtain signals from a captured set of satellites responsive to the captured set of satellites matching the first sub-set of satellites with the fourth sub-set of satellites removed therefrom.

18. The one or more computer storage devices of claim 17 having further computer-executable instructions comprising:
  - using ray tracing and heuristics to determine which of the one or more satellites that are detected but are not predicted to have line-of-sight visibility are probabilistically detected to be from reflection, based upon the ray tracing and heuristics.

19. The one or more computer storage devices of claim 17 having further computer-executable instructions comprising:
  - determining an approximate location of the GPS-capable device in a dead zone based upon a failure by the GPS-capable device to detect a satellite signal from any satellite in the fourth sub-set.

20. The one or more computer storage devices of claim 17 having further computer-executable instructions comprising:

routing a vehicle associated with the GPS-capable device around an area based upon the satellite visibility-related data.

* * * * *